United States Patent [19]

Turban

[11] Patent Number: 5,373,502
[45] Date of Patent: Dec. 13, 1994

[54] PROCESS, TRANSMITTER AND RECEIVER FOR DATA TRANSMISSION WITH VARIABLE TRAFFIC VOLUME AND A CONTROL STATION FOR COORDINATING SEVERAL SUCH TRANSMITTERS AND RECEIVERS

[75] Inventor: Karl-Albert Turban, Leonberg, Germany

[73] Assignee: Alcatel N.V., Amsterdam, Netherlands

[21] Appl. No.: 36,904

[22] Filed: Mar. 25, 1993

[30] Foreign Application Priority Data

Mar. 30, 1992 [DE] Germany ............................. 4210305

[51] Int. Cl.[5] ............................................. H04J 13/00
[52] U.S. Cl. ........................................ 370/18; 370/19; 370/79; 370/95.1; 370/95.3
[58] Field of Search ...................... 370/18, 19, 21, 22, 370/79, 95.1, 95.3

[56] References Cited

U.S. PATENT DOCUMENTS

| 4,494,228 | 1/1985 | Gutleber | 370/18 |
| 4,754,453 | 6/1988 | Eizenhöfer | 370/95.1 |
| 4,763,322 | 8/1988 | Eizenhöfer | 370/95.1 |
| 4,799,252 | 1/1989 | Eizenhöfer et al. | 379/59 |

FOREIGN PATENT DOCUMENTS

| 3313841A1 | 4/1983 | Germany | H04J 6/02 |
| 3603826 | 8/1986 | Germany | H04J 13/00 |
| 3527331 | 2/1987 | Germany | H04J 15/00 |

Primary Examiner—Douglas W. Olms
Assistant Examiner—Russell W. Blum
Attorney, Agent, or Firm—Ware, Fressola, Van Der Sluys & Adolphson

[57] ABSTRACT

During data transmission or transmission of redundancy-reduced signals, the traffic volume and, hence, the necessary transmission capacity are not constant. Instead of the prior art approach of more or less intensive use of the total capacity, the basic idea of the invention is coded transmission and simultaneous use of more or less many, mutually orthogonal codes. An embodiment shows the use of a mixed code-division multiplex (CDMA)-time division multiplex (TDMA) radio system. The number of channels assigned to a signal station (CDMA) is determined anew frame-by-frame (TDMA) in response to requests in preceding frames.

16 Claims, 3 Drawing Sheets

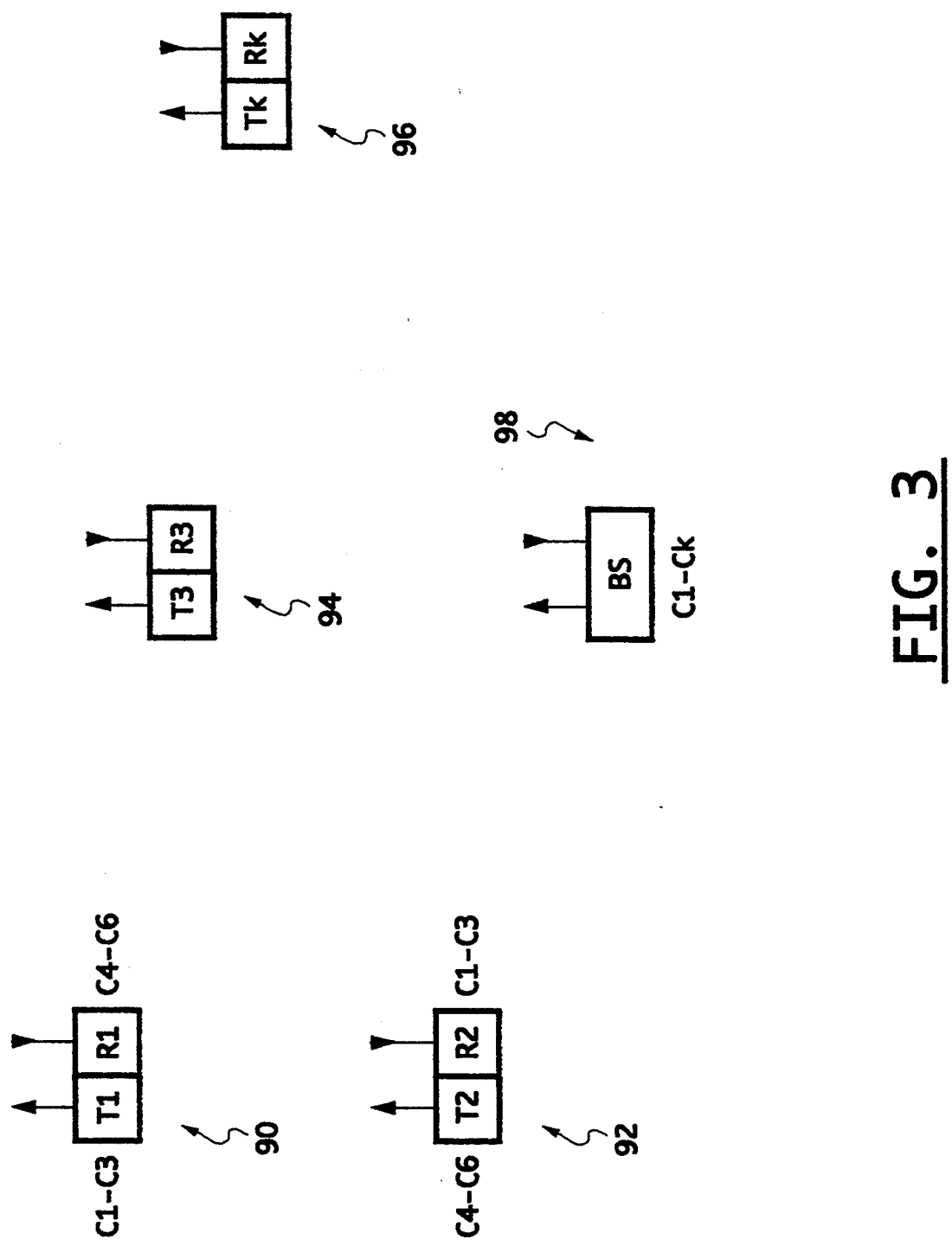

PROCESS, TRANSMITTER AND RECEIVER FOR DATA TRANSMISSION WITH VARIABLE TRAFFIC VOLUME AND A CONTROL STATION FOR COORDINATING SEVERAL SUCH TRANSMITTERS AND RECEIVERS

TECHNICAL FIELD

The invention relates to a data transmission process with variable traffic volume and corresponding transmitters and receivers and, more particularly, to a control station for coordinating several such transmitters and receivers.

BACKGROUND OF THE INVENTION

Future telecommunication is characterized by an ever increasing part of nonverbal services. Intermittent traffic volume is characteristic of nonverbal services. The transmission capacity required for such services is therefore not constant. Video transmissions occupy a certain intermediate position. The starting point is the analog video signal, which is periodically scanned and converted into a digital signal with constant data flow. Aside from the television-radio service, in which no digitalization takes place, the very high traffic volume of video signals is not accepted. For that reason, the redundancy contained in such signals is reduced to a greater or lesser degree by means of "videocodecs". The greater the reduction of redundancies, the less constant is the traffic volume. The reduction of redundancies also plays a role in voice transmission by radio. Voice pauses can be recognized and no signal is transmitted during such voice pauses.

An expanded solution for the transmission of signals with variable traffic volume consists of separating the total capacity of a transmission channel into equally long sections (time slots, cells), and utilizing more or less of these sections for a single transmission. The remaining sections are either used in the time multiplex for other transmissions, are filled with blank information, or they are not used. Examples are the multiple access to telecommunication satellites with the Time Division Multiple Access (TDMA), or the Asynchronous Transfer Mode (ATM) in broad-band networks.

The disadvantages of this solution are greater interference occurring, above all during radio traffic, which is due to the time compression; the greater expense for synchronization in radio networks, in which different running times must also be taken into consideration; and sharp limitation of the total capacity. Even if a lower transmission quality is accepted, the total capacity of a transmission medium can only be increased at great expense.

DISCLOSURE OF INVENTION

An object of the invention is to provide a solution to the problem of data transmission with variable traffic volume.

According to a first aspect of the present invention, coded parallel data is transmitted in time, with the simultaneous use of more or less many, mutually orthogonal codes.

According further to this first aspect of the present invention, a data stream to be transmitted as a whole is divided into time intervals which are subdivided into parts whose number depends on the current traffic volume and which each contain a predetermined number of data, and that the different parts, coded with different, mutually orthogonal codes, are transmitted simultaneously over the same transmission medium and subsequently recombined into the whole.

In further accord with the first aspect of the present invention, a demultiplexer is provided for dividing a data stream to be transmitted into time intervals which are subdivided into parts whose number depends on the current traffic volume and which each contain a predetermined number of data, that coders are provided by which the different parts are coded with different, mutually orthogonal codes, and that the differently-coded parts are transmitted simultaneously over the same transmission medium.

In accordance with a second aspect of the present invention, a plurality of decoders are provided which use different, mutually orthogonal codes and decode a plurality of signals received simultaneously over the same transmission medium and that a multiplexer is provided which combines the information decoded by the different decoders into a whole if said information represents useful information.

According to a third aspect of the present invention, a control station assigns a number of different, mutually orthogonal codes to the various transmitters and receivers in response to requests therefrom.

A configuration example is a mixed CDMA-TDMA radio system, in which the number of channels assigned to a single station (Code-multiplex, CDMA) is determined anew, frame by frame (TDMA), on the basis of the requirements of previous frames.

The use of a code for modulating a signal, and the resulting code-multiplex in which several different, mutually orthogonal codes are used, is known in itself. The simplest, and easiest to understand, case of code modulation is the modulation of a signal with a binary code. This case can be described as a change of amplitude modulation and the resulting frequency multiplex. With amplitude modulation, a carrier signal periodically changes the polarity of a baseband signal on the transmission side, in accordance with the carrier frequency pulse. A synchronous demodulator at the receiving end now changes the polarity of the signal to the correct phase at the same pulse frequency, recreating the original baseband signal. If the pulses (frequencies), with which the polarity is changed on the transmitting and the receiving side, differ from each other, the original signal is not recreated, it rather remains a signal that is at the zero time-center because of the constant polarity changes, and can easily be eliminated by the filter. It is therefore possible and commonplace to modulate several baseband signals with different carrier frequencies, transmit them through the same transmission medium, and separate them at the receiving end with synchronous demodulation and simple low-pass filters. (However, the separation frequently occurs in band-pass filters before the demodulation).

In principle, nothing changes if different mutually orthogonal code signals are used, instead of the periodic carrier signals, for the polarity change on the transmitting side and at the synchronous receiving end.

Two codes are then considered mutually orthogonal, if they keep the signal fully suppressed, after having been used in sequence to change the polarity of that same signal. Examples of such orthogonal digital signals are known as Walsh functions and Rademacher functions.

For the purpose at hand in particular, the code-multiplex has several advantages over the time-multiplex. With the code-multiplex, signals modulated with different codes are fairly independent of each other. A reciprocal effect is only produced under less than ideal conditions of the system. The individual codes need not to be synchronized with each other, insofar as the property of noncorrelation is also provided in addition to the property of orthogonality, even though such synchronization can very easily be achieved. The running times need not be taken into account when different codes are used by different stations of a radio network or a local network (LAN). With many time-multiplex systems, the unused time periods must be filled with blank signals, to maintain the synchronization, for example. If allowed by the given transmission medium, each code can easily be added, and possibly reduces the transmission quality of the others slightly. The upper limit of the capacity of a transmission medium is determined by the number of codes, which are mutually orthogonal on the one hand, and can be transmitted by the transmission medium, on the other.

In principle, the code modulation can also take place by not using the code signal to change the polarity of the baseband signal, but using the baseband signal to turn the code signal on and off, or by switching the baseband signal between two code signals. This presupposes that the baseband signal is digital and not analog, which is anyway a given, as a rule. A check must then be made at the receiving end whether the code signal is present or not, or which of the two code signals in question is being received. The first type, in which the code signal changes the polarity of the baseband signal, is known as the straddle band technique. It is also possible with this technique to use the baseband signal to switch between two code signals, by using a second code signal to change the polarity of the inverted baseband signal. The code signals are mostly binary pseudorandom sequences with large, sometimes extremely large code lengths. At the same time, the code signals are used for coding. With the sometimes extremely long code lengths (with running times on the order of a month), synchronization is impossible without additional information, even with a known code. In the instance at hand, it is proposed to start all codes in a defined manner, when the number of the utilized codes changes as a result of a change in the traffic volume. In the preferred case, in which the assignment of the codes is always for fixed periods of time, their length should be equal to such a period of time, or the code should be completely repeated during such a period of time.

Significantly shorter code lengths are indicated, when the baseband signal switches the code signal on or off in bits. In this instance it is possible to use sequences as code signals, whose code lengths always correspond to the duration of a baseband signal bit, and which also have a fixed phase position with respect to the bit cycle.

In both instances, the physical properties are essentially the same, insofar as the code cycle is the same. In the latter case, it is possible to save on the transmission output.

These and other objects, features and advantages of the present invention will become more apparent in light of the detailed description of a best mode embodiment thereof, as illustrated in the accompanying drawing.

BRIEF DESCRIPTION OF THE DRAWING

FIG. 3 shows a plurality of stations along with a base station using the same transmission medium, according to the invention.

BEST MODE FOR CARRYING OUT THE INVENTION

Figure 1:
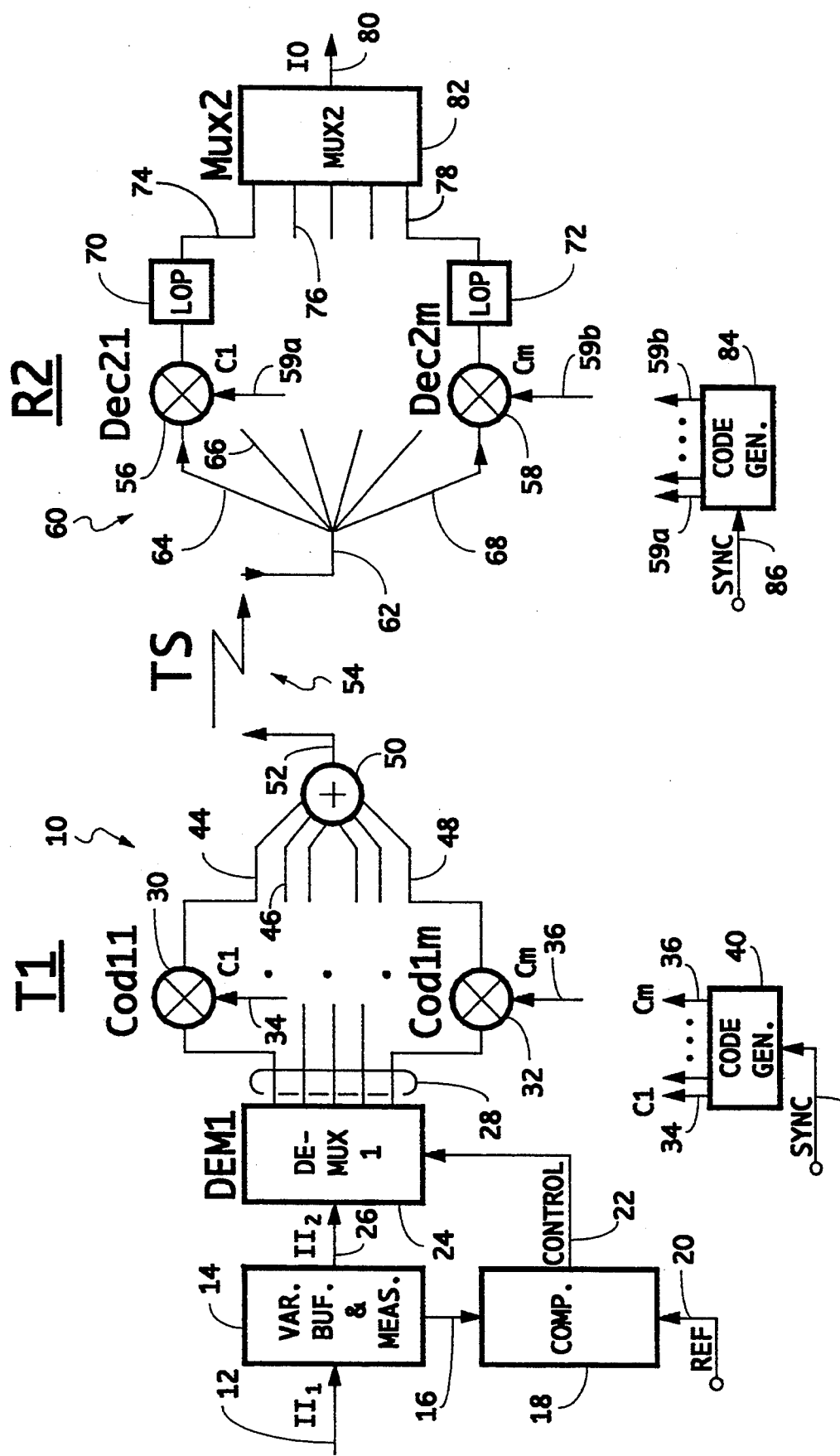
FIG. 1 shows a communications system according to the present invention.

Referring to FIG. 1, the extent of the actual traffic volume must first be detected on a transmission side 10. This can be done, for example, by means of a signal $II_1$ on a line 12 from the data source. Variable buffer storage 14, e.g. a Fifo, are often used for variable traffic volume. In such instances, the actual fill condition of the buffer storage is indicated on a line 16 and indicates the actual traffic volume. Also, constant measurement of the incoming amount of data per time unit may be performed to provide information about the actual traffic volume. An actual value can be adaptively determined in the known manner from successively determined values of a traffic volume, both for the purpose of predicting and for smoothing out the traffic volume. Any of these known techniques may be carried out as indicated generally in the block 14.

According to the invention, the determined actual traffic volume is now indicated on a signal line 16 and compared in a comparator 18 to a specified reference value on a line 20, and a value is determined therefrom, which indicates the number of data to be simultaneously transmitted. In the event a Fifo is used for buffer storage, this value can be formed by division of the fill condition.

In accordance with the determined value, a control signal is provided on a line 22 and the entire buffered data stream $II_2$ provided on a line 26 is now separated by a demultiplexer 24 (Dem1) into more or less many parallel data streams on lines 28. The signal on the line 26 is shown, for example, in FIG. 2(a), stream ($II_2$) divided into time intervals (T1, T2, T3) which are subdivided into parts (I1–I6) whose number depends on the current traffic volume and which each contain a predetermined number of data (e.g., bits). A component 24 that is normally described as demultiplexing can be used as a demultiplexer, which has a data input and several data outputs that can be turned on by control inputs indicated generally by the line 22. In ATM, for example, five successive ATM-cells can be switched to five different outputs, where they are temporarily stored and further processed at the same time. Also a bit-wise distribution by a series-parallel converter operating as a demultiplexer (shift register with serial input and parallel output) is possible. Depending on the value used, one bit each, for example, must be input successively and serially five times, and five bits must then be output simultaneously in parallel. Each of the parallel data streams is now either rescanned (modulated) by itself, but simultaneously, by an inherent code sequence, or is used to turn a code sequence on and off, or to switch between two code sequences. The necessary switches, change-overs, mixers or multipliers are generally well known. These are not shown, but the coding process is indicated generally by a plurality of coders (Cod11, . . .

, Cod1m) 30, ..., 32, each responsive to a corresponding code signal (C1–Cm) 34, ..., 36.

The applicable code signals 34, ..., 36 are either stored as such, or are continuously produced anew in suitable regenerative shift registers, in the known manner as shown generally by a code signal generator 40. In principle and in practice, it is of secondary importance whether all possible code signals are always produced or read-out from memory, or only those used at the time.

Synchronization of the individual code signals with each other, as indicated generally by a synchronization signal on a line 42, is very significant in practice. Although such synchronization is not absolutely necessary, it eases the synchronization at the receiving end, however. If the synchronization of the code signals with each other on the transmission side is only provided for one of the code signals at the receiving end, it immediately ensures the synchronization of each arriving code signal. The lack of synchronization of the code signals with each other can also be detrimental to the orthogonality of the code.

The synchronization of the codes with each other can take place, for example, by using regenerated shift registers, insofar as they produce equal code lengths, where they start simultaneously from defined starting points and operate with a common cycle. Synchronization of the codes with each other can also be achieved by filing them in dynamic RAMs (DRAM) in such a way, that one bit from each code is filed at each address. A DRAM with a size of 2K×8 would be able to store eight codes with 2048 bits each. However, with each startup, the codes must first be written into the DRAMs, for which purpose they must be built anew on the basis of an algorithm, for example.

If the preparation on the transmission side is program controlled, for example by means of a signal processor, the synchronization is necessary when all functions in the time multiplex are realized by the very same program. These functions are, above all, the coding, but also the demultiplexing function and the production of code signals.

Synchronization between code signals and the signals to be transmitted can also be useful. It must be attempted, in particular, to select the basic cycle of one code signal as an integral multiple of the cycle of the signals to be transmitted, and to phase-lock these cycles to each other.

Two particularly advantageous coupling types for code signals and signals to be transmitted should be pointed out:

In the event that certain sequences are used as code signals, it must be attempted to have such a sequence coincide precisely with one bit from the signal to be transmitted.

If pseudo-random sequences are used as code signals, it is useful if such a sequence coincides with a block, for example an ATM-cell, of the signal to be transmitted.

Until now it had been quietly assumed that the signal to be transmitted is a digital signal. However, this assumption is not compulsory. Basically, an analog signal can also be multiplied by a code signal. A scanned analog signal with discrete time values can also be temporarily stored and expanded in time to form partial time-parallel signals, perhaps by using charge-coupled devices. The fact that, with the analog transmission of digital signals by means of modems, their transmission speed can be varied on the basis of a changing transmission quality, can be seen as a variable traffic volume with an analog signal for example. A variation of the bandwidth can result from a variation of the scanning cycle.

Figure 2:
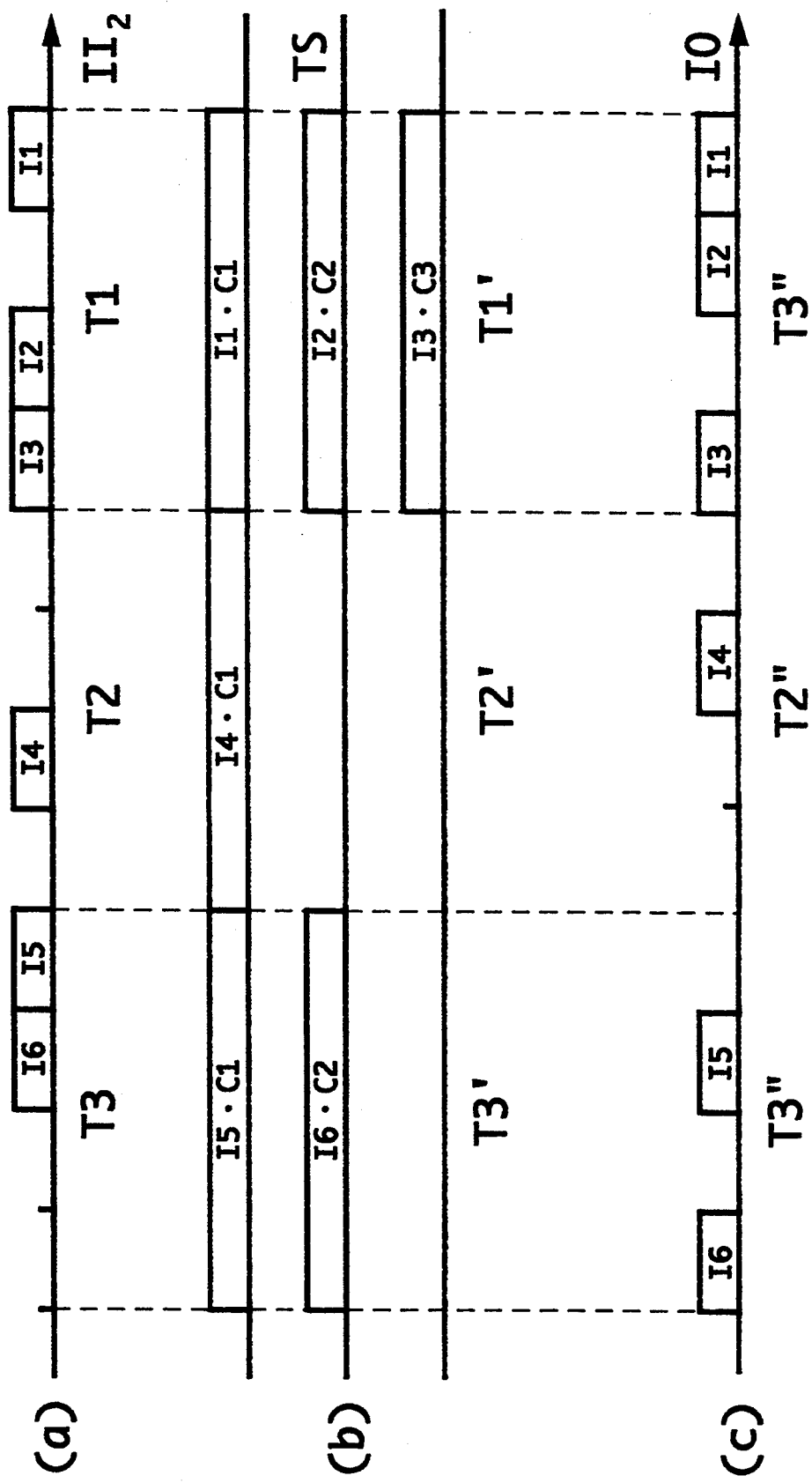
FIGS. 2(a)–(c) compare the signal input to the transmitter of the system of FIG. 1 with the signal transmitted over the transmission medium and with the recovered signal in the receiver.

If the actual traffic volume in FIG. 2 and FIG. 2(a) has been determined and the input data stream on the line 26 has been divided into correspondingly more or less many parallel data streams on the lines 28, and multiplication of the data streams in the corresponding coders 30, ..., 32 by code signals 34, ..., 36 takes place, the resulting partially coded data streams on lines 44, 46, .., 48 are combined as shown in FIG. 2(b). Although later in time, it will be noted that the time intervals (T1', T2', T3') correspond to the intervals T1, T2, T3 of FIG. 2(a). This combination takes place through analog summation in a summer 50 which provides a summed signal on a line 52. Other data streams that are to be transmitted by the same transmitter via the same transmission medium can be added here as well. Such additional data streams can be signalizing signals, for example, which are to be transmitted to the same receiver, or in principle, they can be data streams that are fully independent of the first data stream, but which were prepared in the same manner, and can also be intended for different receivers. It is of course necessary to code all data streams with different codes, so that they can be separated again at the receiving end.

A radio channel 54, or a passive electrical or optical transmission network, for example, can be used as the transmission medium.

It is not compulsory to transmit all individual data streams with the same amplitude and the same output, both of which are often called levels. A signalizing signal, which possibly operates at a reduced clock rate, can also be added with a correspondingly reduced amplitude and still be recovered at the receiving end with the same quality. For different receivers, certain data streams need not all be added with the same amplitude. It is sufficient to send each (partial) data stream with the amplitude at which it can still be correctly received.

Several decoders (Dec21, ..., Dec2m) 56, ..., 58 are located at a receiving end 60, to simultaneously decode a received input signal on a line 62 which is split into a plurality of signal lines 64, 66, ..., 68. As stated earlier, the decoding takes place through repeated multiplication for each line by the same code signal used on the transmission side, followed by filtering, as indicated, e.g., by low-pass filters 70, 72. Subsequently, decoded partial data streams on lines 74, 76, ..., 78 are combined into the original data stream (IO) on a line 80 by means of a multiplexer 82. The combined signal on the line 80 is shown in FIG. 2(c), where it may be compared to the input signal on line 26 as shown in FIG. 2(a) The time intervals T1", T2", T3" correspond to the original intervals T1, T2, T3, although later in time. All of these functions, as well as the corresponding functions on the transmission side, can be realized by discrete circuits, program-controlled processing or the like.

For each partial signal to be received, either a decoder consisting of a code signal from a generator 84 and multiplier 56, ..., 58 must be provided, or for program-controlled processing, it must be ensured that a corresponding number of decoder functions can be processed. If it is assured, on the one hand, that all codes can never be used at the same time, and it is always known in advance on the other hand, which codes are being used, then it is sufficient if only as many decoders or decoder functions are realized, as there are codes that can be used simultaneously. Otherwise, each code must be provided with its own decoder.

The decoding must of course be code-synchronous, to cancel the coding on the transmission side. Suitable synchronization circuits for synchronizing an individual signal are well known and may be provided separately or within the code signal generator 84c. If the individual codes are synchronized with each other on the transmission side, they must also be synchronized with each other at the receiving end (insofar as they are not physically different so that they expand differently in the transmission medium), and it is sufficient to synchronize one code each time. A code synchronization signal 86 may be recovered from the incoming signal; this may be done by the above-mentioned synchronization circuit which may include a synchronization signal detector responsive to the signal on the line 62 for providing the signal on the line 86. With the variable traffic volume assumed in this instance, which leads to the simultaneous use of more or less many codes, it is sufficient if a basic load is present, which ensures that at least one code is always transmitted, at least intermittently. Such a basic load can also be ensured by blank information. If a signalizing signal is additionally transmitted with its own code, it can also be used for the synchronization. In this case it is sufficient as well for both the signalization and not only for the synchronization, if a signal is transmitted at regular intervals.

In order to subsequently recombine the partial data streams into a single data stream in a multiplexer, it is necessary to know which codes are actually being used, and how the individual partial data streams are to be correctly recombined. The necessary knowledge can be exchanged by signalization. A one-time arrangement is also sufficient with regard to the order of the partial data streams that are transmitted by different codes. Which codes are actually being used can be determined from the received signal. In that case a decoder must be active for each code, and it must be determined at the decoder output whether a signal containing information is present, or not. The partial data streams must then be combined in the succeeding multiplexer, in accordance with their order.

It is useful for the switching between more or less many partial data streams not to take place at random points in time. It is rather advantageous when the entire data transmission is divided into successive time periods of equal length, and if the number of the codes used within one such time period remains unchanged.

It is also useful to synchronize the codes with the beginning of these time periods. The length of a time period should be equal to the running length of the codes, or an integral multiple thereof.

If, as described earlier, the number of codes being used, and their selection from the set of codes available from the participating stations, is determined by means of signalization, it must take place before the time period of their utilization. It may be useful to basically reestablish the codes being used before each time period, or only to make new arrangements when changes are necessary.

These arrangements or determinations can take place with or without prior confirmation. It is therefore possible to announce during the first time period and to utilize during the second. However, it is also possible to request during the first time period, to allocate during the second, and only to utilize during the third time period.

Aside from the already mentioned out-band signalization, in which a separate signalization channel is created by using an additional code, an in-band signalization can also be created in such a way, that the individual time periods have both (shorter) subsections for signalization as well as (longer) subsections for data transmission. The distribution of the subsections among themselves can be variable.

The above described process is already advantageous when only one sender communicates with one receiver through the same transmission medium, as shown in FIG. 3. However, it becomes particularly advantageous when several stations exchange data through the same transmission medium. In particular, such stations are combined transmitter-receivers, but also individual transmitters and receivers. In the simplest case, two transmitter-receiver stations 90, 92 share a common transmission medium and a specified set of codes, to exchange data with each other. The directional separation, which is always required in a common transmission medium, occurs here by using different codes. Two such stations often operate in such a way, that the one with a high traffic volume transmits data, and the other with a low traffic volume returns acknowledgment signals, and both stations alternate reciprocally.

An entire network of stations 90, 92, 94, . . . , 96 can operate in this manner. For example, such a network can be a radio network with a predetermined radio frequency used in free space as the transmission medium, or a so-called local area network, in which several stations exchange data with each other in a closed ring. Known types of operation of such networks are time-division-multiplex access, in which more or less many time slots are allocated as needed. There are very many possibilities for the allocation of these time slots, which can all be used more or less with the required allocation of codes in the invention.

A basic possibility consists in a station 98 operating as the control station, the master or base station (BS), to which the requests for transmission capacity, codes in this instance, are directed and which then allocates the codes on the basis of the requests. Another basic possibility is a locally controlled capacity allocation on the basis of an allocation procedure known to all stations, and based on requests directed to all stations or at least available to all stations. An example of local capacity allocation is described in DE-OS 33 13 841.

The signalization required for the distribution of the codes can take place as described above. When an in-band signalization is used, the already mentioned possibility exists, to divide each time period into subsections for signalization and subsections for data transmission, as well as the possibility to insert time periods for the exclusive use of signalization.

An out-band signalization with the use of separate codes can take place by dividing in time the signalization code channel into the individual stations. It is also possible to provide each station with its own code, instead of a single signalization code for all stations, creating partial channels in this way. In that instance, the signalization of all stations runs parallel in time. The transmission speed of the signalization channels, the bit cycle of the signalization code and the level of these channels as well, can clearly be reduced in this way without detracting from the transmission quality. However, this requires a further number of codes, which are also mutually orthogonal and in regard to all other codes as well.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method for data transmission with variable traffic volume, wherein a data stream to be transmitted as a whole is divided into time intervals which are subdivided into parts whose number depends on the current traffic volume and which each contain a predetermined number of data, and that the different parts, coded with different, mutually orthogonal codes, are transmitted simultaneously over the same transmission medium and subsequently recombined into the whole.

2. A method as claimed in claim 1, wherein the different codes used for coding the different parts are selected according to a fixed rule of order and wherein the fixed rule of order is used for decoding the different parts after transmission over the transmission medium, by which an unambiguous relationship is established between the subdivided and recombined parts and the whole.

3. A method as claimed in claim 1, wherein the time intervals are of equal length, and wherein a number of codes used is unchanged within a time interval.

4. A method as claimed in claim 3, wherein all the codes used are synchronized with one another and with beginnings of the time intervals.

5. A method as claimed in claim 3, wherein the number of codes used and selection of the codes are agreed between stations at respective ends of the transmission medium by suitable signaling prior to a time interval of use of the codes.

6. A method as in claim 5, wherein the codes used are agreed to anew before each time interval.

7. A method as claimed in claim 5, wherein new agreements are only made when changes in the traffic volume take place.

8. A method as in claim 5, wherein the time intervals contain subsections for signalization and subsections for data transmission.

9. A method as in claim 5, wherein signalization and data transmission take place with separate codes.

10. A method as claimed in claim 1, wherein a plurality of stations share the same transmission medium and a predetermined set of codes, and that the codes are assigned to the individual stations according to the respective traffic volumes of the stations.

11. A method as in claim 10, wherein one of the stations is the control station, that requests for codes are only made to the control station, and that codes are only allocated by the control station.

12. A method as in claim 10, wherein the allocation of the codes is made locally, on the basis of an allocation procedure known to all stations, and on the basis of requests directed to all stations.

13. A method as claimed in claim 1, wherein the levels with which the different parts are transmitted are fixed separately.

14. A transmitter for data transmission with variable traffic volume, wherein a demultiplexer is provided for dividing a data stream to be transmitted into time intervals which are subdivided into parts whose number depends on the current traffic volume and which each contain a predetermined number of data, that coders are provided by which the different parts are coded with different, mutually orthogonal codes, and that the differently-coded parts are transmitted simultaneously over the same transmission medium.

15. A receiver for simultaneous reception of plural signals, said signals being indicative of parts of a data stream with variable traffic volume, said parts being determined by the division of said data stream, within a time interval, based on the traffic volume in said data stream, said parts being coded by mutually orthogonal codes for simultaneous transmission, the receiver having a plurality of decoders which use different, mutually orthogonal codes to decode a plurality of said signals received simultaneously over the same transmission medium, and having a multiplexer which combines said signals decoded by the different decoders into a whole indicative of said data stream.

16. A control station for coordinating a plurality of transmitters and receivers which each transmit and receive, respectively, signals indicative of parts of a data stream with variable traffic volume, said parts being determined by the division of said data stream, within a time interval, based on the traffic volume in said data stream, wherein the control station includes a control station receiver, responsive to requests from the plurality of transmitters and receivers, for assigning different, mutually orthogonal codes to the plurality of transmitters and receivers, said parts being coded by said mutually orthogonal codes for simultaneous transmission, and wherein the control station includes a control station transmitter for transmitting the assigned codes to the plurality of transmitters and receivers.

* * * * *